United States Patent
Dufter

(10) Patent No.: US 7,038,693 B2
(45) Date of Patent: May 2, 2006

(54) METHOD FOR CREATING PIXEL-ORIENTED PICTORIAL DATASETS FOR REPRESENTING GRAPHIC SYMBOLS BY A NUMERICAL CONTROL

(75) Inventor: Alfred Dufter, Inzell (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 125 days.

(21) Appl. No.: 10/198,060

(22) Filed: Jul. 18, 2002

(65) Prior Publication Data

US 2003/0020723 A1    Jan. 30, 2003

(30) Foreign Application Priority Data

Jul. 18, 2001  (DE) ................................. 101 34 270

(51) Int. Cl.
    *G09G 5/00*   (2006.01)
    *G06T 11/00*  (2006.01)

(52) U.S. Cl. .................. 345/581; 345/619; 345/471

(58) Field of Classification Search ............... 345/581, 345/589, 593, 612–613, 619, 630, 467–468, 345/501, 530, 536, 541, 701, 700, 761, 705
See application file for complete search history.

(56) References Cited

U.S. PATENT DOCUMENTS

| 5,689,286 | A | 11/1997 | Wugofski |
| 5,696,914 | A | 12/1997 | Nahaboo et al. |
| 5,710,880 | A * | 1/1998 | Howlett et al. ............. 345/468 |
| 5,734,761 | A * | 3/1998 | Bagley ........................ 382/309 |
| 5,774,133 | A * | 6/1998 | Neave et al. ............... 345/505 |
| 5,917,484 | A | 6/1999 | Mullaney |
| 5,974,253 | A * | 10/1999 | Nahaboo et al. ............ 717/105 |
| 5,986,654 | A | 11/1999 | Alexander et al. |
| 5,994,908 | A * | 11/1999 | Mc Mahon ................. 324/694 |
| 6,256,409 | B1 * | 7/2001 | Wang ......................... 382/170 |
| 6,320,602 | B1 | 11/2001 | Burkardt et al. |
| 2001/0024208 | A1 | 9/2001 | Geisler |
| 2002/0075289 | A1 * | 6/2002 | Hatori et al. ............... 345/698 |
| 2003/0115552 | A1 * | 6/2003 | Jahnke et al. .............. 715/536 |
| 2003/0135358 | A1 * | 7/2003 | Lissauer et al. ............... 704/2 |

FOREIGN PATENT DOCUMENTS

| DE | 43 08 291 | 9/1994 |
| DE | 693 24 966 | 5/1999 |
| DE | 693 27 948 | 3/2000 |
| DE | 199 46 660 | 4/2001 |
| DE | 199 63 754 | 7/2001 |

* cited by examiner

*Primary Examiner*—Matthew C. Bella
*Assistant Examiner*—Wesner Sajous
(74) *Attorney, Agent, or Firm*—Brinks Hofer Gilson & Lione

(57) ABSTRACT

A method for creating pixel-oriented pictorial datasets for representing graphic symbols with geometric elements and texts. The method includes a) storing image description datasets for a graphic symbol, b) storing at least one text dataset, c) storing user-specific prerequisites in at least one user dataset and d) creating a set of pixel-oriented image datasets by using the image description datasets, the at least one text datasets and the at least one user dataset.

37 Claims, 2 Drawing Sheets

METHOD FOR CREATING PIXEL-ORIENTED PICTORIAL DATASETS FOR REPRESENTING GRAPHIC SYMBOLS BY A NUMERICAL CONTROL

Applicant claims, under 35 U.S.C. § 119, the benefit of priority of the filing date of Jul. 18, 2001 of a German patent application, copy attached, Serial Number 101 34 270.5, filed on the aforementioned date, the entire contents of which is incorporated herein by reference.

BACKGROUND OF THE INVENTION

1. Field of the Invention

The present invention relates to a method for creating pixel-oriented pictorial datasets for representing graphic symbols with geometric elements and texts by a numerical control.

2. Discussion of Related Art

A modem numerical control represents graphic symbols (icons) on a display screen, which permits the user of a machine tool which is controlled by a numerical control to easily enter commands by functional keys (soft keys), or to receive information regarding the status of the tool or aids regarding the situation at that time in a graphic and therefore easily understandable form. Here, the graphic symbols include two- or three-dimensional objects, which are possibly supplemented by text, or of text only.

Since such numerical controls are used in different countries, it is necessary to adapt the texts of the graphic symbols to the language of the respective country. Since moreover different display devices (display screens) are employed by the users, it is necessary to make the graphic symbols available in the most different resolutions in order to assure easy recognition on the respective display device.

The graphic symbols are stored in a data memory of the numerical control in a pixel-oriented manner, i.e. pixel by pixel. A pictorial editing device is used for producing the graphic symbols, which also operates in a pixel-oriented manner. The outlay for producing all required symbols is large because of the multitude of possible combinations of languages and display screen resolutions, since a single set of graphic symbols can already have several hundred different elements.

If the requirements of the user change, for example because of a new display device of higher resolution, the producer of the control device first must elaborately produce, deliver and install a new set of graphic symbols. This considerably limits the flexibility of such control devices. A simple recalculation of the existing images stored in a pixel-oriented manner to produce a new display screen resolution would lead to fuzzy edges of the graphic symbols.

To become independent of the respective resolution of the display device, it is known to store graphic symbols in a vector-oriented form. However, the outlay for representing such vector graphics increases with the complexity of the objects to be represented and therefore stresses the processor of the numerical control more than the display of pixel-oriented graphics, in particular if three-dimensional images are to be used.

A system, which permits the modification of individual icons by pre-established libraries, is proposed in U.S. Pat. No. 5,689,286, the entire contents of which is incorporated herein by reference. Individual portions of the icons can be changed in a definite manner, and thereafter the icon can again be stored as a pixel-oriented dataset in a memory. However, the system does not permit the change of the properties of an entire set of graphic symbols.

OBJECT AND SUMMARY OF THE INVENTION

It is an object of the present invention to disclose a method which permits the user of a numerical control to produce a user-specific set of graphic symbols for display on a display screen in a simple manner.

This object is attained by a method for creating pixel-oriented pictorial datasets for representing graphic symbols with geometric elements and texts. The method includes a) storing image description datasets for a graphic symbol, b) storing at least one text dataset, c) storing user-specific prerequisites in at least one user dataset and d) creating a set of pixel-oriented image datasets by using the image description datasets, the at least one text datasets and the at least one user dataset.

This object is also attained by a numerical control and display device that includes a display screen and a memory area that includes an image description dataset for a graphic symbol displayed on the display screen, a plurality of text datasets wherein each one of the text datasets corresponds to a different language and a user dataset that includes user-specific information. A processing unit connected to the memory area and the processing unit processes information from the image description dataset, the plurality of text datasets and the user-specific information so as to create a set of pixel-oriented image datasets that are displayed on the display screen.

It is proposed to store image description datasets and text datasets, as well as user datasets in addition, in a numerical control. The desired graphic symbols in the form of pixel-oriented image datasets are created in a processing unit. If now the resolution of the graphic symbols to be displayed on a new display screen, for example, is to be changed, it is sufficient to change the corresponding parameter in the user dataset. The new set of graphic symbols is then automatically produced in the processing unit. The outlay for producing a set of graphic symbols in a new language is reduced to the establishment of a text dataset with the texts intended for display in the desired language.

Further advantages, as well as details of the present invention result from the following description of the method and numerical control by the drawings.

DETAILED DESCRIPTION OF THE PREFERRED EMBODIMENTS

Figure 1:
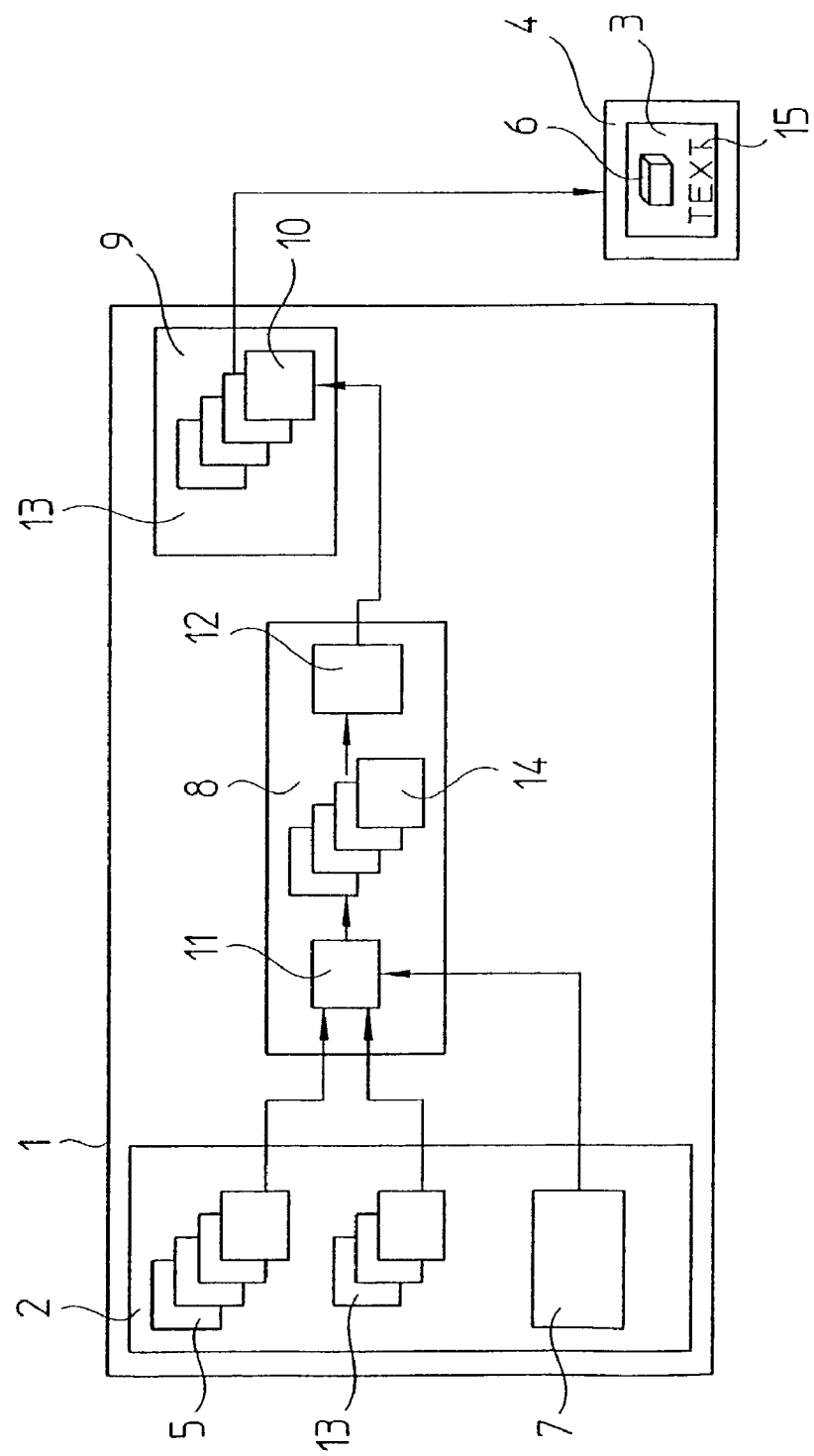
FIG. 1 represents a block diagram of an embodiment of a numerical control in accordance with the present invention.
Figure 2:
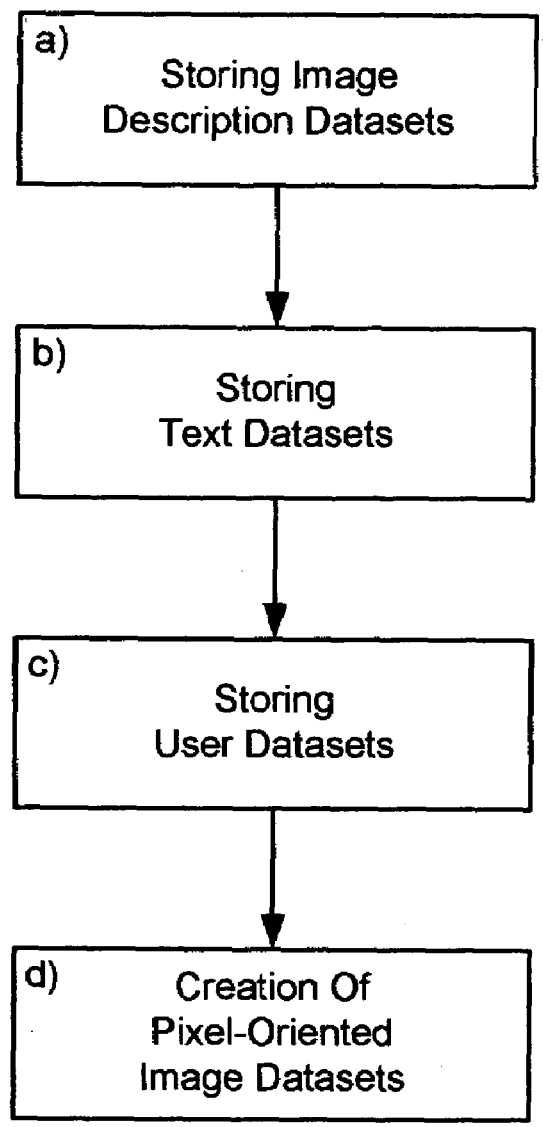
FIG. 2 shows an embodiment of a method for producing image datasets in accordance with the present invention.

It is intended to explain the method, by which user-specific graphic symbols for display on a display screen of a numerical control can be created, by the steps a) to d) in FIG. 2. The devices of the numerical control required for this are represented in FIG. 1.

A first memory area 2 of a numerical control 1 can be seen in FIG. 1. Various data are stored by the producer of the numerical control in this first memory area 2.

An image description dataset 5 for each graphic symbol 3 intended to be displayed on a display screen 4 is stored in a step a). In this case this image description dataset 5 contains the information regarding the geometric structure, and therefore the shape, of the elements 6 to be displayed, such as the cube in the graphic symbol 3 in FIG. 1. Descriptive languages for this already exist, which can also represent complex two-dimensional or three-dimensional elements 6. Editing devices are available for producing these image description datasets 5.

It is moreover possible to establish a material for each element 6. For example, it is possible to assign a material to cube of the graphic symbol which has been defined as material for a "workpiece" or a "tool 1" or a "tool 2." Shortly after the material has been assigned to the cube of the graphic symbol, for example, the material "workpiece" or the material "tool 1" or the material "tool 2" is assigned to the cube of the graphic symbol 3. Please note that the term "material" as used in this paragraph and in other portions of this application regards optical properties of graphic symbols used. For example, "material" can be textual matter associated with a graphical symbol or it can be a simplified model of optical properties of surfaces/volumes which are to be visually represented. Examples of optical properties are reflection/refraction coefficients, colors, diffusive and specular coefficients, etc.

For graphic symbols 3 which have a text 15, the text 15 is either already established in the image description dataset 5 (independent of language), or is inserted by text variables (dependent on language). These text variables are later used for representing texts 15 as a function of the desired language. Moreover, the appearance of these texts 15, such as orientation or script size, is determined in the image description dataset 5. It can be provided to establish properties, such as the color of the script and the type of the script, by materials whose exact appearance is defined only later, the same as that of the materials of the elements 6.

Since as mentioned, hundreds of graphic symbols 3 can exist in a modem numerical control 1, an entire set of image description datasets 5 is created.

One text dataset 13 for each desired language is stored in a step b) in the first memory area 2. A set of text datasets 13 is created by this. Exact language-dependent texts 15 are assigned in each one of the text datasets 13 to the text variables used in the image description datasets 5. If at a later time it is intended to use graphic symbols 3 with texts 15 in a new language, it is merely necessary to make a further text dataset 13 in the respective language available.

Finally, in step c) user-specific information is stored in at least one user dataset 7. It is possible then to centrally establish the appearance of the materials for the elements 6 and texts 15 used in the image description data sets 5, and specific properties can be assigned. The color "green", or the degree of reflection "10%" are examples of such specific properties of the materials. For example, the user of the numerical control can match the appearance of the display screen 4 to the colors of his company by a parameter "color" for the background of the graphic symbols 3.

In this way it is therefore possible to establish the appearance of the graphic symbols 3 with the elements 6 and texts 15 by the parameters of the materials. It is sufficient to change individual material parameters for changing the appearance of all graphic symbols.

Further properties which can be affected by the user are, for example, the direction of illumination, the casting of shadows and the viewing angle for three-dimensional elements 3. A particularly important parameter, which must be established in the user dataset 7, is the resolution of the connected display screen 4. Only in this way is it possible to create graphic symbols 3 later, which are optimally matched to the respective display screen. It can be advantageous to preset several display screen resolutions if it is intended to make frequent changes between different display screens 4.

The user of the numerical control establishes all prerequisites for the set of graphic symbols 3 in steps a), b) and c). These three steps can be performed in any arbitrary sequence and at any arbitrary chronological intervals, all that is required is to have all information from the image description datasets 5, text datasets 13 and user datasets 7 available prior to the next step d).

In this step d), a processing unit 8 processes the data from the first memory area 2 and creates a set of pixel-oriented image datasets 10, which are suitable for rapid display on the display screen 4 and are stored in a second memory area 9. The first memory area 2 and the second memory area 9 can also be identical here.

A so-called ray-tracer 12, which can calculate pixel-oriented image datasets 10 from the image description datasets 5, can operate in the processing unit 8. For being able to employ a conventional ray-tracer 12, it is necessary to first connect the image description datasets 5 with the language-dependent texts 15 from the text datasets 13 in a filter 11 in the processing unit 8. In the course of this the filter 11 also takes the above described information in the user dataset 7 into consideration.

Temporary image description datasets 14 are created as an intermediate step, which contain the information regarding the elements 6, as well as the text 15 to be displayed and their respective appearance. The filter 11 generates a complete set of temporary image description datasets 14 for each existing text dataset 13. Then these temporary image description datasets 14 are calculated into pixel-oriented image datasets 10 by the ray-tracer 12.

In place of the conventional ray-tracer 12 it is of course possible to operate a specialized ray-tracer 12 in the processing unit 8, which can process the image description datasets 5, text datasets 13 and the user datasets 7 into pixel-oriented image datasets 10.

If the finished set of pixel-oriented image datasets 10 is now present in the second memory area 9, the numerical control 1 can access these image datasets 10 for the representation of graphic symbols 3. For this purpose it is also possible to store several sets of pixel-oriented image datasets 10, for example in different languages or display screen resolutions, in the second memory area 9.

If several sets of pixel-oriented image datasets 10 are created, for example for different languages, it would be practical to store them in a compressed form, since the pixel-oriented image datasets 10 only differ in the area of their language-dependent texts.

Now, if for example a new display screen resolution is to be used in the numerical control 1, it is only necessary to set the respective parameter in the user dataset 7. Then the processing unit 8 creates a new set of pixel-oriented image datasets 10 of the desired display screen resolution from the already existing image description datasets 5, the text datasets 13 and the parameters in the user dataset 7.

If a new language is to be used, it is sufficient to install an appropriate text dataset 13. The graphic symbols 3 are again automatically produced by the processing unit 8. The elaborate manual processing of each individual pixel-oriented image dataset 10, as in the prior art, or of the image description datasets 5, is not required.

Within the scope of the present invention, further embodiment variations of course also exist besides the explained example.

I claim:

1. A method for creating pixel-oriented pictorial datasets for representing graphic symbols with geometric elements and texts, the method comprising:
   a) storing image description datasets for a graphic symbol, wherein said image description datasets comprise text variables and establishing texts of said graphic symbol, wherein said text variables are used for representing said texts of said graphic symbol independent of any language of said graphic symbol;
   b) storing at least one text dataset, including text to be assigned to said text variables used in said image description datasets;
   c) storing user-specific prerequisites in at least one user dataset; and
   d) creating a set of pixel-oriented image datasets by using said image description datasets, said at least one text datasets and said at least one user dataset.

2. The method for creating pixel-oriented pictorial datasets in accordance with claim 1, wherein step a) further comprises establishing materials of said geometric element, or text.

3. The method for creating pixel-oriented pictorial datasets in accordance with claim 1, further comprises establishing a geometric structure of a geometric element in said image description datasets in step a).

4. The method for creating pixel-oriented pictorial datasets in accordance with claim 3, wherein step a) further comprises establishing materials of said geometric element, or text.

5. The method for creating pixel-oriented pictorial datasets in accordance with claim 4, wherein specific properties are assigned to the materials used in said image description datasets in step c).

6. The method for creating pixel-oriented pictorial datasets in accordance with claim 1, wherein step c) further comprises establishing at least one desired display screen resolution of a display screen used for displaying said graphic symbol.

7. The method for creating pixel-oriented pictorial datasets in accordance with claim 1, wherein step d) further comprises forming temporary image description datasets by connecting said image description datasets and said text data sets; the method further comprises:
   producing pixel-oriented image datasets from said temporary image description datasets and by taking into consideration information in said at least one user dataset.

8. The method of claim 7, further comprising storing said pixel-oriented image datasets.

9. A method for creating pixel-oriented pictorial datasets for representing graphic symbols with geometric elements and texts, the method comprising:
   a) storing image description datasets for a graphic symbol, wherein said image description datasets comprise text variables and establishing texts of said graphic symbol wherein said text variables are used for representing said texts of said graphic symbol as a function of a desired language;
   b) storing at least one text dataset for said desired language, including text to be assigned to said text variables used in said image description datasets;
   c) storing user-specific prerequisites in at least one user dataset; and
   d) creating a set of pixel-oriented image datasets by using said image description datasets, said at least one text datasets and said at least one user dataset.

10. The method for creating pixel-oriented pictorial datasets in accordance with claim 9, further comprises establishing a geometric structure of a geometric element in said image description datasets in step a).

11. The method for creating pixel-oriented pictorial datasets in accordance with claim 10, wherein step a) further comprises establishing materials of said geometric element, or text.

12. The method for creating pixel-oriented pictorial datasets in accordance with claim 9, wherein step a) further comprises establishing materials of said geometric element, or text.

13. The method for creating pixel-oriented pictorial datasets in accordance with claim 9, wherein step b) further comprises establishing a text dataset for each of said one or more languages, said text dataset assigns language-dependent texts to text variables established in said image description datasets.

14. The method for creating pixel-oriented pictorial datasets in accordance with claim 9, wherein step c) further comprises establishing at least one desired display screen resolution of a display screen used for displaying said graphic symbol.

15. The method for creating pixel-oriented pictorial datasets in accordance with claim 11, wherein specific properties are assigned to the materials used in said image description datasets in step c).

16. The method for creating pixel-oriented pictorial datasets in accordance with claim 9, wherein step d) further comprises forming temporary image description datasets by connecting said image description datasets and said text data sets; the method further comprises:
   producing pixel-oriented image datasets from said temporary image description datasets and by taking into consideration information in said at least one user dataset.

17. The method of claim 16, further comprising storing said pixel-oriented image datasets.

18. A numerical control and display device comprising:
   a display screen;
   a memory area that includes:
      an image description dataset for a graphic symbol displayed on said a display screen, wherein said graphic symbol comprising a text and said image description dataset comprise text variables, wherein said text variables are used for representing said text of said graphic symbol as a function of a desired language;
      a plurality of text datasets wherein each one of said text datasets corresponds to a different language and includes text to be assigned to said text variables used in said image description dataset;
      a user dataset that comprises user-specific information; and
   a processing unit connected to said memory area and said processing unit processes information from said image description dataset, said plurality of text datasets and said user-specific information so as to create a set of pixel-oriented image datasets that are displayed on said display screen.

19. The numerical control and display device of claim 18, wherein said processing unit comprises a ray-tracer that calculates said pixel-oriented image datasets from said image description dataset.

20. The numerical control and display device of claim 19, wherein said processing unit further comprises a filter that receives said process information from said image description dataset, said plurality of text datasets and said user-specific information and connects said image description dataset with language-dependent text of said graphic symbol via said text dataset.

21. The numerical control and display device of claim 20, wherein said filter creates temporary image description datasets which contain information regarding elements as well as text of said graphic symbol to be displayed on said display screen.

22. The numerical control and display device of claim 21, wherein said temporary image description datasets are fed to said ray tracer that generates said pixel-oriented image datasets based on said temporary image description datasets.

23. The numerical control and display device of claim 18, wherein said image description dataset contains information regarding geometric structure of an element of said graphic symbol.

24. The numerical control and display device of claim 18, wherein said image description dataset contains information regarding color of a portion of said graphic symbol.

25. The numerical control and display device of claim 18, wherein said image description dataset contains information regarding a type of script of text that forms part of said graphic symbol.

26. The numerical control and display device of claim 18, wherein said user dataset contains information regarding a desired resolution for said display screen.

27. The numerical control and display device of claim 26, wherein said processing unit generates said graphic symbol so as to optimally matched with said desired resolution for said display screen.

28. A numerical control and display device comprising:
a display screen;
a memory area that includes:
an image description dataset for a graphic symbol displayed on said a display screen, wherein said graphic symbol comprising a text and said image description dataset comprise text variables, wherein said text variables are used for representing said text of said graphic symbol independent of any language;
a plurality of text datasets wherein each one of said text datasets corresponds to a different language and includes text to be assigned to said text variables used in said image description dataset;
a user dataset that comprises user-specific information; and
a processing unit connected to said memory area and said processing unit processes information from said image description dataset, said plurality of text datasets and said user-specific information so as to create a set of pixel-oriented image datasets that are displayed on said display screen.

29. The numerical control and display device of claim 28, wherein said processing unit comprises a ray-tracer that calculates said pixel-oriented image datasets from said image description dataset.

30. The numerical control and display device of claim 29, wherein said processing unit further comprises a filter that receives said process information from said image description dataset, said plurality of text datasets and said user-specific information and connects said image description dataset with language-dependent text of said graphic symbol via said text dataset.

31. The numerical control and display device of claim 30, wherein said filter creates temporary image description datasets which contain information regarding elements as well as text of said graphic symbol to be displayed on said display screen.

32. The numerical control and display device of claim 31, wherein said temporary image description datasets are fed to said ray tracer that generates said pixel-oriented image datasets based on said temporary image description datasets.

33. The numerical control and display device of claim 28, wherein said image description dataset contains information regarding geometric structure of an element of said graphic symbol.

34. The numerical control and display device of claim 28, wherein said image description dataset contains information regarding color of a portion of said graphic symbol.

35. The numerical control and display device of claim 28, wherein said image description dataset contains information regarding a type of script of text that forms part of said graphic symbol.

36. The numerical control and display device of claim 28, wherein said user dataset contains information regarding a desired resolution for said display screen.

37. The numerical control and display device of claim 36, wherein said processing unit generates said graphic symbol so as to optimally matched with said desired resolution for said display screen.

* * * * *